United States Patent
Masuoka et al.

(10) Patent No.: US 10,174,430 B2
(45) Date of Patent: Jan. 8, 2019

(54) SI-CONTAINING HIGH STRENGTH COLD ROLLED STEEL SHEET, METHOD OF PRODUCING THE SAME, AND AUTOMOTIVE MEMBERS

(71) Applicant: JFE STEEL CORPORATION, Chiyoda-ku, Tokyo (JP)

(72) Inventors: Hiroyuki Masuoka, Tokyo (JP); Reiko Sugihara, Tokyo (JP); Takashi Kawano, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 442 days.

(21) Appl. No.: 14/379,968

(22) PCT Filed: Feb. 25, 2013

(86) PCT No.: PCT/JP2013/054716
§ 371 (c)(1),
(2) Date: Aug. 20, 2014

(87) PCT Pub. No.: WO2013/129295
PCT Pub. Date: Sep. 6, 2013

(65) Prior Publication Data
US 2015/0027600 A1   Jan. 29, 2015

(30) Foreign Application Priority Data

Feb. 28, 2012 (JP) ................. 2012-040956

(51) Int. Cl.
| | |
|---|---|
| C21D 1/26 | (2006.01) |
| C23G 1/08 | (2006.01) |
| C21D 9/46 | (2006.01) |
| C22C 38/04 | (2006.01) |
| C22C 38/58 | (2006.01) |
| C22C 38/02 | (2006.01) |
| C22C 38/06 | (2006.01) |
| C21D 6/00 | (2006.01) |
| C21D 8/02 | (2006.01) |
| C23F 17/00 | (2006.01) |
| B62D 29/00 | (2006.01) |

(52) U.S. Cl.
CPC ............ *C23G 1/086* (2013.01); *C21D 6/005* (2013.01); *C21D 6/008* (2013.01); *C21D 8/0226* (2013.01); *C21D 8/0236* (2013.01); *C21D 8/0273* (2013.01); *C21D 9/46* (2013.01); *C22C 38/02* (2013.01); *C22C 38/04* (2013.01); *C22C 38/06* (2013.01); *C22C 38/58* (2013.01); *C23F 17/00* (2013.01); *C23G 1/085* (2013.01); *B62D 29/007* (2013.01); *C21D 1/26* (2013.01); *C21D 2211/002* (2013.01); *C21D 2211/005* (2013.01)

(58) Field of Classification Search
CPC ........... C21D 1/26; C21D 6/008; C21D 6/005
See application file for complete search history.

(56) References Cited

FOREIGN PATENT DOCUMENTS

| | | |
|---|---|---|
| EP | 1865085 | 12/2007 |
| EP | 2612956 | 7/2013 |
| EP | 2612957 | 7/2013 |
| JP | 58-100622 | 6/1983 |
| JP | 2003-226920 A | 8/2003 |
| JP | 2006283131 | 10/2006 |
| JP | 3889768 | 12/2006 |
| JP | 3889769 | 12/2006 |
| JP | 2007-162057 A | 6/2007 |
| JP | 2009-221586 A | 10/2009 |
| JP | 2010-53446 A | 3/2010 |
| JP | 2012-132092 A | 7/2012 |

OTHER PUBLICATIONS

Machine translation of JP 2009221586, 2009.*
International Preliminary Report on Patentability and Written Opinion dated Sep. 2, 2014, application No. PCT/JP2013/054716.
Chinese Office action dated Aug. 24, 2015 for Chinese Application No. 201380010457.4, with English translation.
European Search Report dated Jul. 3, 2015 in European Application No. 13755355.8.
Korean Office Action dated Nov. 2, 2015 for Korean Application No. 2014-7021260 with English abstract.
International Search Report dated Apr. 16, 2013, application No. PCT/JP2013/054716.
Chinese Office Action dated Mar. 14, 2016 for Chinese Application No. 201380010457.4 with Concise Statement of Relevance.
Japanese Office Action dated Jan. 20, 2015 for Japanese Application No. JP2014-502198 with Concise Statement of Relevance.

* cited by examiner

*Primary Examiner* — Edward M Johnson
(74) *Attorney, Agent, or Firm* — RatnerPrestia

(57) ABSTRACT

A Si-containing high-strength cold rolled steel sheet has a chemical composition comprising C: 0.02~0.3 mass %, Si: 0.8~2.0 mass %, Mn: 1.0~5.0 mass % and the remainder being Fe and inevitable impurities with a ratio of Si content to Mn content (Si/Mn) exceeding 0.4, and has a tensile strength TS of not less than 780 MPa, wherein a metallic structure of the steel sheet surface contains polygonal ferrite and/or bainitic ferrite having a Si concentration of not more than 3.0 mass % and a grain size of not more than 10 μm and does not have a Si-containing oxide layer on the steel sheet surface.

8 Claims, 1 Drawing Sheet

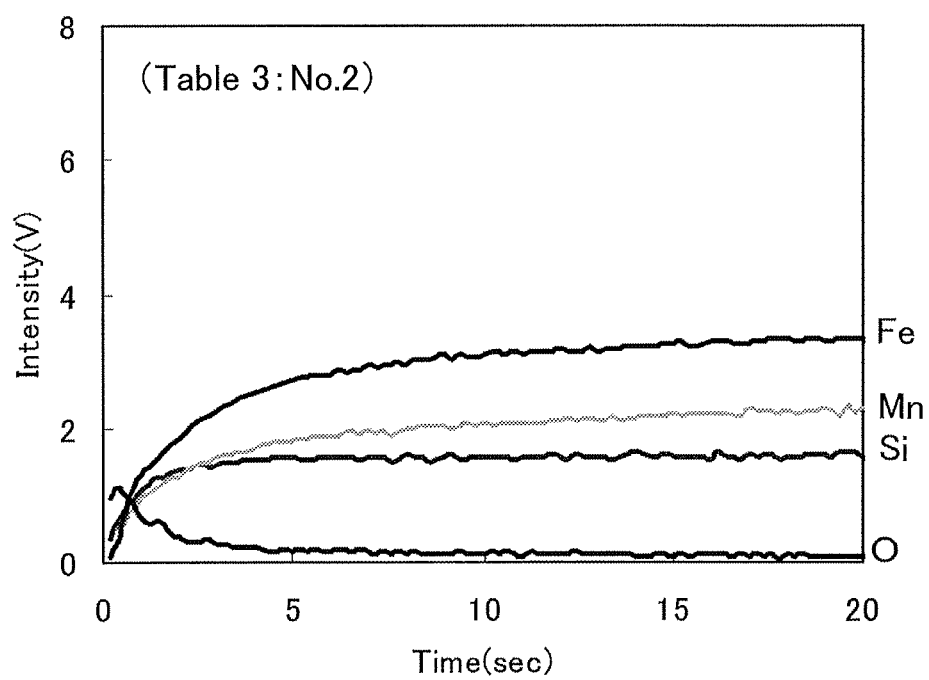

SI-CONTAINING HIGH STRENGTH COLD ROLLED STEEL SHEET, METHOD OF PRODUCING THE SAME, AND AUTOMOTIVE MEMBERS

CROSS REFERENCE TO RELATED APPLICATIONS

This is the U.S. National Phase application of PCT/JP2013/054716, filed Feb. 25, 2013, which claims priority to Japanese Patent Application No. 2012-040956, filed Feb. 28, 2012, the disclosures of each of these applications being incorporated herein by reference in their entireties for all purposes.

FIELD OF THE INVENTION

This invention relates to a Si-containing high-strength cold rolled steel sheet, a method of manufacturing the same, and an automotive member. More particularly, this invention relates to a high-strength cold rolled steel sheet being excellent not only in phosphatability even if a large amount of Si is contained therein, but also in corrosion resistance after coating, which is evaluated by a warm salt water immersion test or a composite cycle corrosion test and having a tensile strength TS of not less than 780 MPa, a method for producing the same, and automotive members using such a steel sheet.

BACKGROUND OF THE INVENTION

In recent years, $CO_2$ reduction is a big issue from a viewpoint of global environmental protection, and hence it is required to dramatically improve fuel efficiency in automobiles being a $CO_2$ generating source. One of effective measures for the improvement of fuel efficiency is a weight reduction of an automobile body by using a high-strength steel sheet. However, the workability of the steel sheet is decreased as its strength is increased, so that it is required to improve the workability when the high-strength steel sheet is used for automotive members pressed into complicated shapes.

As one of addition elements effective for establishing both the increase of the strength and the improvement of the workability in the steel sheet is mentioned Si, which can be added in combination with C, Mn or the like to form a structure of steel having a high strength and an excellent workability, e.g., a structure of steel containing ferrite or bainitic ferrite and mixing with martensite or residual austenite.

Also, the pressed automotive members are commonly subjected to a phosphating treatment and then an electrodeposition coating after being assembled into an automobile body in order to improve the corrosion resistance. However, Si is known as a harmful element deteriorating the phosphatability of steel. Because the Si-containing steel sheet easily forms a Si-containing oxide on a surface of the steel sheet in its production process and such an oxide hinders phosphating reaction and causes such a problem that phosphating crystals to be formed uniformly and finely are coarsened or an area forming no phosphating crystal (what is called "lack of covering") is generated.

As a measure for solving such a problem, for example, Patent Documents 1 and 2 propose techniques of manufacturing a high-strength cold rolled steel sheet with a phosphatability and hence a coating adhesion improved by controlling a ratio of Si content to Mn content (Si/Mn) to not more than 0.40 and further limiting a composition and an abundance of a metallic structure or a surface oxide.

PATENT DOCUMENTS

Patent Document 1: Japanese Patent No. 3889768
Patent Document 2: Japanese Patent No. 3889769

SUMMARY OF THE INVENTION

Heretofore, the application of high-strength steel sheets of 590 MPa class to automobile bodies has been almost completed, and in order to attain weight reduction effect by further increasing the strength, it is required to utilize a high-strength steel sheet having a tensile strength of not less than 780 MPa. As one of measures solving the above task, it is examined that Mn content is increased to increase the strength, while Si is added at an amount that the value of (Si/Mn) exceeds 0.4 to effectively utilize the effect of Si desirable for the strength and the workability.

On the other hand, the lowering of a temperature of a phosphating solution is recently promoted from a viewpoint of the reduction of industrial wastes and saving of running cost and energy, and hence the reactivity of the phosphating solution comes down. The lowering of the phosphating solution temperature does not substantially come into problem in the conventionally used low-strength steel sheets with a small amount of alloy added when the surface conditioning technique before the phosphating or the like is improved. However, the high-strength steel sheets containing a large amount of Si are susceptible to the lowering of the treating solution, and the phosphatability may be deteriorated considerably. Since the technique disclosed in Patent Documents 1 and 2 is a method for improving the phosphatability by limiting a ratio of Si content to Mn content (Si/Mn) to not more than 0.4, it is not an effective measure for improving the phosphatability of a steel sheet with (Si/Mn) exceeding 0.4.

The invention is made in view of the aforementioned problems inherent to the conventional techniques, and aims to provide a high-strength cold rolled steel sheet being excellent not only in the phosphatability even if the ratio of Si content to Mn content (Si/Mn) exceeds 0.4 but also in the corrosion resistance after coating and having a tensile strength TS of not less than 780 MPa and a method of manufacturing the same and to provide automotive members using the above steel sheet.

In order to solve the above task, the inventors have made various studies on an influence of a steel sheet surface structure in steel sheets having a ratio of Si content to Mn content (Si/Mn) of more than 0.4 upon the phosphatability. Consequently, it has been found that the reason why the phosphatability is deteriorated or the lack of covering in phosphating crystals is caused in the steel sheets having a ratio of Si content to Mn content (Si/Mn) of more than 0.4 is due to the fact that an area of locally promoting dissolution is generated at an initial reaction stage of causing dissolution of the steel sheet surface in the phosphating solution, and the presence of the selective dissolved area obstructs surrounding dissolution to make formation of phosphating crystal nucleus non-uniform. Also, it has been found that the local dissolution is likely to be caused in a specific structure of the steel sheet surface, concretely, in polygonal ferrite or bainitic ferrite having a Si concentration of more than 3.0 mass % and/or a grain size of more than 10 µm, and therefore it is required to properly adjust the surface structure of the steel sheet in order to improve the phosphatability in the steel sheet having (Si/Mn) of more than 0.4, and the invention has been accomplished.

The invention based on the above findings includes a Si-containing high-strength cold rolled steel sheet having a chemical composition comprising C: 0.02~0.3 mass %, Si: 0.8~2.0 mass %, Mn: 1.0~5.0 mass % and the remainder being Fe and inevitable impurities with a ratio of Si content to Mn content (Si/Mn) exceeding 0.4 and having a tensile strength TS of not less than 780 MPa, wherein a metallic structure of the steel sheet surface contains polygonal ferrite and/or bainitic ferrite having a Si concentration of not more than 3.0 mass % and a grain size of not more than 10 μm and does not have a Si-containing oxide layer on the steel sheet surface.

Also, the invention is characterized in that a steel slab having the above chemical composition is preferably hot rolled, cold rolled, subjected to a continuous annealing wherein a cooling stop temperature in the cooling after soaking annealing is higher than 300° C., and then pickled to remove a Si-containing oxide layer from the surface of the steel sheet.

The method for manufacturing a Si-containing high-strength cold rolled steel sheet according to the invention is characterized in that the above pickling is preferably conducted using either one of a mixed acid of nitric acid and hydrochloric acid, a mixed acid of hydrofluoric acid and hydrochloric acid, and a mixed acid of nitric acid, hydrofluoric acid, and hydrochloric acid as a pickling solution.

Also, the method for manufacturing a Si-containing high-strength cold rolled steel sheet according to the invention is characterized in that the pickling is preferably conducted by using a mixed acid of nitric acid and hydrochloric acid having a concentration of nitric acid of more than 100 g/L but not more than 150 g/L and a concentration ratio of hydrochloric acid to nitric acid R (HCl/HNO$_3$) of 0.03~0.25, or a mixed aid of hydrofluoric acid and hydrochloric acid having a concentration of hydrofluoric acid of more than 100 g/L but not more than 150 g/L and a ratio of hydrochloric acid to hydrofluoric acid R (HCl/HF) of 0.03~0.25.

Further, the method for manufacturing a Si-containing high-strength cold rolled steel sheet according to the invention is characterized in that the pickling is preferably conducted at a picking solution temperature of 20~70° C. for 3~30 seconds.

Moreover, the invention includes an automotive member characterized by using the above Si-containing high-strength cold rolled steel sheet.

According to the invention, good phosphatability can be obtained even in not only the steel sheet containing a large amount of Si at a content ratio (Si/Mn) exceeding 0.4 but also the treating solution having a lowered temperature, and also there can be provided a high-strength steel sheet being excellent in the corrosion resistance after coating under a severer corrosive environment such as a warm salt water immersion test or a composite cycle erosion test and having a tensile strength TS of not less than 780 MPa. Therefore, according to the invention, the application of the high-strength cold rolled steel sheet having excellent phosphatability and corrosion resistance to automotive members can be facilitated to largely contribute the weight reduction in an automobile body.

BRIEF DESCRIPTION OF THE DRAWING

FIG. 1 is a profile of O, Si, Mn and Fe in depth direction when a surface of a steel sheet pickled under preferable conditions of the invention is subjected to a surface analysis using a GDS.

DETAILED DESCRIPTION OF EMBODIMENTS OF THE INVENTION

There will be described the basic technical idea of the invention below.

An annealing process with a continuous annealing furnace is conducted for recrystallizing a steel sheet hardened through cold rolling to provide desirable structure, strength and workability, wherein a non-oxidizing or reducing gas is usually used as an atmosphere gas and a dew point thereof is strictly controlled. Therefore, oxidation on the steel sheet surface is suppressed in general-purpose cold rolled steel sheets having a small addition amount of alloy. However, in steel sheets containing a large amount of Si or Mn, which is more easily oxidizable as compared with Fe, even if the composition and dew point of the atmosphere gas in the annealing are controlled strictly, it is unavoidable that Si or Mn is easily oxidized to form a Si-containing oxide such as Si oxide (SiO$_2$), Si—Mn based composite oxide or the like on the steel sheet surface. The Si-containing oxide is formed not only on the steel sheet surface but also in the interior of the base metal. Accordingly, it is known that the Si-containing oxide hinders the etching properties of the steel sheet surface in the phosphate treatment (zinc phosphate treatment) as a substrate treatment before an electrodeposition coating for an automobile body and adversely affects the formation of a good phosphated film (phosphating crystal).

On the other hand, the lowering of the phosphating solution temperature is recently promoted for the purpose of reducing an amount of sludge generated in the phosphate treatment or a running cost, and hence the phosphate treatment is conducted under a condition that the reactivity of the phosphating solution to the steel sheet surface is largely decreased as compared to the conventional one. Especially, such a change of the phosphate treatment condition is not a problem for the conventionally used general-purpose cold rolled steel sheets with a small addition amount of alloy owing to the improvement in the surface conditioning technique or the like. However, in the steel sheets containing a large amount of alloying component such as Si, Mn or the like, especially high-strength cold rolled steel sheets having a large addition amount of Si for increasing the strength, the above change of the phosphate treatment condition has a great influence. In the cold rolled steel sheet containing a large amount of Si, therefore, it is required that the surface condition (chemical composition, crystal structure, grain size and the like) of the steel sheet itself is optimized corresponding to the deterioration in the phosphate treatment condition so as to enhance the reactivity to the phosphating solution.

The inventors have made various studies on the method for improving the phosphatability of the steel sheet in correspondence with the above deterioration of the phosphate treatment condition. As a result, the inventors have found that it is effective to control the manufacturing conditions before the continuous annealing to properly adjust the structure of the steel sheet surface (crystal structure, grain size) while strong pickling is conducted with a pickling solution prepared by mixing nitric acid and/or hydrofluoric acid with hydrochloric acid to remove a Si-containing oxide layer formed on the steel sheet surface by continuous annealing or the like. Here, the Si-containing oxide is $SiO_2$ or Si—Mn based composite oxide formed on the steel sheet surface or along with crystal grain boundary in the interior of the steel sheet in slab heating or annealing after hot rolling or cold rolling.

An area where the Si-containing oxide exists on the surface of the steel sheet after the annealing is varied depending on the steel sheet composition or the annealing conditions (temperature, time and atmosphere), but it is generally a portion of about 1 μm from the surface of the steel sheet. The removal of the Si-containing oxide layer in the invention means that the area of existing the Si-containing oxide layer is removed by pickling up to a level of appearing no peak of Si or O when the steel sheet surface after the pickling is analyzed in depth direction by GDS (glow discharge emission spectral analysis).

The reason why strong acids such as nitric acid, hydrofluoric acid, hydrochloric acid and the like are used as the pickling solution is due to the fact that Si—Mn based composite oxide is easily dissolved in an acid among the Si containing oxides, but $SiO_2$ is hardly-soluble, so that it is required to remove the Si-containing oxides on the steel sheet surface together with the base metal.

According to the inventors' studies, however, it is revealed that the phosphatability is largely improved by strong-pickling the steel sheet surface with nitric acid or hydrofluoric acid and hydrochloric acid after the continuous annealing to remove the Si-containing oxide layer existing thereon, but sometimes the phosphatability may be deteriorated. As a result of investigations of the cause, it has been found that when polygonal ferrite or bainitic ferrite having a high Si concentration and a large grain size is existent on the steel sheet surface after the removal of the Si-containing oxide layer by the strong-pickling, partial dissolution is caused in the phosphating solution to block uniform formation of a phosphated coating to thereby decrease the phosphatability, and therefore it is effective to limit the Si concentrations and the crystal grain sizes in the polygonal ferrite and bainitic ferrite in order to improve the phosphatability of the steel sheet containing a large amount of Si.

The invention is based on the above new knowledge.

There will be described a chemical composition of the Si-containing high-strength cold rolled steel sheet according to an embodiment of the invention.

C: 0.02~0.3 mass %

C is an element necessary for enhancing the strength of the steel, and is required to be added in an amount of not less than 0.02 mass % in order to obtain a tensile strength of not less than 780 MPa. On the other hand, when an addition amount exceeds 0.3 mass %, the weldability is deteriorated significantly. Therefore, C is within a range of 0.01~0.3 mass %. Preferably, it is within a range of 0.07~0.22 mass %.

Si: 0.8~2.0 Mass %

Si has an effect of increasing the strength without damaging the workability and is an addition element essential or preferred in the invention. When Si is added in an amount of not less than 0.8 mass %, the above effect can be obtained. However, when the addition amount exceeds 2.0 mass %, not only the weight bearing in the cold rolling becomes excessive, but also cracking is easily caused at the end portion of the steel sheet to impede the productivity. Therefore, Si is advantageously maintained within a range of 0.8~2.0 mass %. Preferably, it is within a range of 1.0~1.6 mass %.

Mn: 1.0~5.0 Mass %

Mn is an element necessary for enhancing the strength of the steel like C and is required to be added in an amount of not less than 1.0 mass % in order to obtain a tensile strength of not less than 780 MPa. On the other hand, when the addition amount exceeds 5.0 mass %, the workability is considerably deteriorated. Therefore, Mn is within a range of 1.0~5.0 mass %. Preferably, it is within a range of 1.4~3.3 mass %.

Si/Mn: More than 0.4

In the steel sheet according to the invention, it is necessary or preferred that a content ratio of Si to Mn (Si/Mn) is more than 0.4. Because when (Si/Mn) exceeds 0.4, both high strength of not less than 780 MPa and excellent workability can be achieved. Moreover, (Si/Mn) is preferably not less than 0.6, more preferably not less than 0.7.

In the Si-containing high-strength cold rolled steel sheet according to the invention, the remainder other than the above ingredients is Fe and inevitable impurities. However, other elements can be contained within the scope not damaging the effect of the invention. For example, P: not more than 0.05 mass %, S: not more than 0.01 mass % and Al: not more than 0.06 mass % can be contained.

In addition to the above chemical composition, the Si-containing high-strength cold rolled steel sheet according to the present invention can contain Nb: not more than 0.3 mass %, Ti: not more than 0.3 mass %, V: not more than 0.3 mass %, Mo: not more than 0.3 mass %, Cr: not more than 0.5 mass %, B: not more than 0.006 mass % and N: not more than 0.008 mass %. Further, Cu: not more than 0.1 mass % and Ni: not more than 0.1 mass % can be contained.

Next, there will be explained a steel sheet surface of the Si-containing high-strength cold rolled sheet according to an embodiment of the invention.

In the high-strength cold rolled sheet according to the invention, the structure of the steel sheet surface is necessary or preferred to include polygonal ferrite and/or bainitic ferrite in order to provide a high strength of not less than 780 MPa and an excellent workability. The structure is preferably within a range of 30%~70% by volume fraction in total. It is more preferably a range of 20~60%, further preferably a range of 25~50%. Moreover, the remainder of the structure may contain no more than 70% of martensite, austenite or the like by volume fraction.

The steel sheet surface in the invention includes a steel sheet surface in a position of 3 μm in depth from the outermost surface of the steel sheet after pickling. Although the term "metallic structure of the surface" generally means a crystal structure exposed to the surface, since surface roughening through the pickling or irregularities due to transcription of surface roughness in the temper rolling roll are existent on the steel sheet surface according to the invention, it is required or preferred to electropolish the steel sheet surface at an electrical quantity of about 2.5~5 coulomb of electricity per 1 $cm^2$ in a solution such as iodine methanol solution or the like to remove a portion of approximately 3 μm in depth from the outermost surface and then observe or analyze the metallic structure thereof.

In the high-strength cold rolled sheet according to the invention, it is necessary or preferred that the grain size of polygonal ferrite and bainitic ferrite exposed to the steel sheet surface after pickling is not more than 10 μm from a viewpoint of ensuring the phosphatability. Si in steel is mostly distributed into a ferrite phase (polygonal ferrite and bainitic ferrite) by heat treatment in the annealing. At this time, the ferrite phase having a high Si concentration forms a starting point of causing partial dissolution in the phosphating solution. Since the partial dissolution is not caused in the form of crossing crystal grain boundaries but occurs in one crystal grain, when crystal grains are existent at a large grain size of more than 10 μm, partial dissolution in a size of approximately 10 μm is caused to make the phosphating reaction non-uniform and deteriorate the phosphatability. The grain size is preferably not more than 7 μm in order to obtain finer and denser phosphated crystals. Here, the grain size in the invention is an average value when a long diameter of crystal grains of polygonal ferrite and bainitic ferrite on the steel sheet surface smoothened by the above method is measured at 10 points or more by means of a length measurement function between 2 points installed in a scanning type electron microscope (SEM).

Moreover, in order to control each grain size of polygonal ferrite and bainitic ferrite to not more than 10 μm, it is preferable to control an annealing temperature and a cooling stop temperature to the following temperature range, respectively.

In the high-strength cold rolled sheet according to the invention, it is necessary or preferred that the Si concentration included in the structures of polygonal ferrite and bainitic ferrite exposed to the steel sheet surface is not more than 3.0 mass %. When it exceeds 3.0 mass %, Si is distributed into ferrite phase (polygonal ferrite and bainitic ferrite) through heat treatment in the annealing to form many starting points for the partial dissolution, so that the formation of phosphating crystals are obstructed to deteriorate the phosphatability. In case of requiring more excellent phosphatability, the concentration is preferable to be not more than 2.5 mass %. In this connection, the Si concentration can be measured by performing a surface analysis on the steel sheet surface smoothened by the above method with EPMA or the like.

Moreover, the cooling stop temperature in the continuous annealing is necessary to be higher than 300° C. as mentioned later in order to control the Si concentration included in the structures of polygonal ferrite and bainitic ferrite to not more than 3.0 mass %. Further, it is preferable to control the annealing temperature within a proper range described below.

The Si-containing high-strength cold rolled sheet according to an embodiment of the invention having the above chemical compositions and the steel sheet surface structure has a tensile strength TS of not less than 780 MPa and an excellent workability.

There will be described the method for manufacturing the Si-containing high-strength cold rolled sheet according to the invention.

The high-strength cold rolled sheet according to the invention can be manufactured by reheating a steel material (slab) satisfying the above chemical composition, hot rolling to form a hot rolled steel sheet, cold rolling the sheet, subjecting the sheet to a continuous annealing, wherein a cooling stop temperature in the cooling after soaking annealing is higher than 300° C., to provide a steel structure required for obtaining necessary strength, phosphatability and corrosion resistance after coating as a steel sheet for an automobile, and thereafter removing a Si-containing oxide layer on a surface layer portion of the steel sheet formed in the continuous annealing through strong pickling with a mixed pickling solution of nitric acid and/or hydrofluoric acid and hydrochloric acid.

In the hot rolling of the above manufacturing method, it is preferable to terminate a finish rolling in an austenite region according to the usual manner. Moreover, in order to refine crystal grains of polygonal ferrite or bainitic ferrite, the finish rolling end temperature is desirable to be just above an $Ar_3$ transformation point, but is preferable to be in a range of 850~940° C. since the rolling load is increased as the temperature is lowered. Further, a coiling temperature is preferable to be in a range of 400~570° C. because when it is too high, the Si-containing oxide is easily formed in grain boundaries close to the steel sheet surface, while when it is too low, the strength of the steel sheet after hot rolling becomes too high and it is difficult to perform the cold rolling.

The hot rolled sheet after the hot rolling is pickled to remove scales formed on the steel sheet surface and cold rolled to obtain a cold rolled sheet having a given thickness, which is then subjected to a continuous annealing for providing the steel sheet with a steel structure required for ensuring desirable strength, workability and phosphatability. In this case, the annealing temperature (soaking temperature) is preferable to be in a range of 760~860° C. When the annealing temperature is too low, the recrystallization is insufficient to deteriorate the workability. While when it is too high, the crystal grain size exceeds 10 μm and the grains are coarsened, and hence the desired strength and phosphatability cannot be obtained. More preferably, it is a range of 780~830° C. When the annealing temperature is not lower than 760° C., the Si concentration included in the structures of polygonal ferrite and bainitic ferrite can be made to not more than 3.0 mass %.

In the continuous annealing, the steel sheet after the soaking annealing is cooled by means of at least one of gas cooling, mist cooling, roll cooling and the like. The cooling is preferable to be a rapid cooling at a cooling rate of not less than 10° C./second. When the rapid cooling of not less than 10° C./second is conducted, residual γ can be generated to increase ductility. Also, the cooling stop temperature is necessary to be higher than 300° C. When the cooling stop temperature is not higher than 300° C., the Si concentration included in the structures of polygonal ferrite and bainitic ferrite cannot be made to not more than 3.0 mass %. Moreover, the upper limit of the cooling stop temperature is preferable to be about 500° C. When it is not higher than 500° C., the steel structure is never coarsened.

Next, the steel sheet subjected to the continuous annealing is preferable to be pickled under the following conditions.

On the continuously annealed steel sheet are generated a large amount of Si-containing oxides such as Si, Si—Mn based composite oxide and the like, so that the phosphatability and corrosion resistance after coating are considerably poor at this state. In the manufacturing method according to the invention, therefore, it is necessary or preferred that the cold rolled steel sheet after the annealing is strong-pickled with strong acids such as nitric acid, hydrofluoric acid, hydrochloric acid and the like as a pickling solution to remove the Si-containing oxide layer on the surface layer of the steel sheet together with the base metal.

In order to remove the Si-containing oxide layer together with the base metal as described above, it is preferable that each concentration of nitric acid and hydrofluoric acid in the pickling solution exceeds 100 g/L. Since nitric acid is also a strong-oxidizable acid, however, an eluted Fe is oxidized to form an iron-based oxide, which is precipitated on the steel sheet surface to affect the phosphatability and corrosion resistance after coating adversely. Since hydrofluoric acid is a dangerous chemical agent being extremely difficult in the handling, it is difficult to perform an industrial operation at the high concentration of hydrofluoric acid. Therefore, it is preferable that each concentration of nitric acid and hydrofluoric acid is controlled to not more than 150 g/L for suppressing the above adverse effects. Consequently, each concentration of nitric acid and hydrofluoric acid is preferable to be more than 100 g/L but not more than 150 g/L. As the pickling solution may be used a mixed acid of nitric acid and hydrofluoric acid. In this case, the concentration in total of nitric acid and hydrofluoric acid is preferable to be more than 100 g/L but not more than 150 g/L. Moreover, even in each case using any of the above acids, a range of 110~140 g/L is more preferable.

However, it is difficult to suppress the formation of the iron-based oxide generated on the steel sheet surface through pickling only by limiting the concentration of nitric acid or hydrofluoric acid to the above range. In the invention, in addition that the concentration of nitric acid or hydrofluoric acid is limited to the above range, it is preferable to conduct pickling with an acid prepared by mixing chloride ion having an oxide layer destruction effect, i.e. hydrochloric acid with nitric acid or hydrofluoric acid so as to render a concentration ratio R of hydrochloric acid to nitric acid or hydrofluoric acid (HCl/HNO3 or HCl/HF) within a range of 0.03~0.25. When the ratio R is not less than 0.03, the effect of suppressing the formation of the iron-based oxide is obtained, while when it is not more than 0.25, the amount of the steel sheet dissolved is not decreased and it is possible to remove the Si-containing oxide layer. Also, when a mixed acid of nitric acid and hydrofluoric acid is used as the pickling solution, the concentration ratio R (HCl/(HNO$_3$+HF)) is preferable to be in a range of 0.03~0.25 likewise. Even in each case using any of the above acids, the concentration ratio R is more preferably within a range of 0.05~0.20.

In the pickling with the mixed acid of nitric acid and hydrochloric acid, the mixed acid of hydrofluoric acid and hydrochloric acid or the mixed acid of nitric acid, hydrofluoric acid and hydrochloric acid as the pickling solution, it is preferable that the pickling is conducted at a pickling solution temperature of 20~70° C. for a pickling time of 3~30 seconds. When the pickling solution temperature is not lower than 20° C. and the pickling time is not less than 3 seconds, the Si-containing oxide layer formed on the surface layer of the steel sheet in the annealing can be sufficiently removed and the phosphatability and corrosion resistance after coating are never deteriorated. On the other hand, when the pickling solution temperature is not higher than 70° C. and/or the pickling time is not more than 30 seconds, the pickling does not become excessive and the steel sheet surface is not made rough, and the phosphated coating becomes uniform, and hence the phosphatability and corrosion resistance after coating are not deteriorated. More preferably, the pickling solution temperature is in a range of 30~50° C. and the pickling time is in a range of 2~20 seconds.

EXAMPLES

Each of steels A~D having a different chemical composition shown in Table 1 is subjected to vacuum melting in a laboratory and casted into a mold to form a steel ingot, which is hot rolled, pickled and cold rolled to form a cold rolled sheet. Moreover, heat treatment temperatures simulating steel ingot heating temperature, rolling end temperature and coiling temperature in the hot rolling are shown in Table 2. The picking is conducted with an aqueous solution of 11 mass % of hydrochloric acid for 85° C.×2 minutes and the cold rolling is conducted at a rolling reduction of 40%. Thereafter, the heat treatment simulating the continuous annealing is conducted under the conditions shown in Table 2. The cooling stop temperature in Table 2 is a temperature corresponding to a cooling end temperature in the forced cooling (which means gas cooling, mist cooling, roll cooling or the like) after the soaking annealing. Moreover, the cooling rate from the soaking temperature to the cooling stop temperature is 12° C./second. The steel sheet after the heat treatment is then pickled on its surface under the condition as shown in Table 2 and then subjected to a temper rolling at an elongation percentage of 0.3~0.6% to provide cold rolled steel sheets No. 1~16.

TABLE 1

| Symbol of steel | Chemical composition (mass %) | | | | | | | Remarks |
|---|---|---|---|---|---|---|---|---|
| | C | Si | Mn | Al | P | S | Si/Mn | |
| A | 0.16 | 0.80 | 1.85 | 0.035 | 0.010 | 0.001 | 0.43 | Invention steel |
| B | 0.18 | 1.90 | 2.70 | 0.038 | 0.007 | 0.001 | 0.70 | Invention steel |
| C | 0.21 | 1.50 | 2.30 | 0.035 | 0.005 | 0.001 | 0.65 | Invention steel |
| D | 0.18 | 0.35 | 2.23 | 0.033 | 0.006 | 0.001 | 0.16 | Conventional steel |

TABLE 2

| Steel sheet No. | Steel symbol | Hot rolling conditions | | | Continuous annealing conditions | |
|---|---|---|---|---|---|---|
| | | Steel ingot heating temperature (° C.) | Finish rolling end temperature (° C.) | Coiling temperature (° C.) | Soaking annealing temperature (° C.) | Cooling stop temperature (° C.) |
| 1 | A | 1200 | 920 | 520 | 1200 | 920 |
| 2 | A | 1200 | 920 | 520 | 830 | 420 |
| 3 | A | 1200 | 920 | 520 | 830 | 420 |
| 4 | A | 1200 | 920 | 520 | 830 | 420 |
| 5 | A | 1200 | 920 | 520 | 830 | 420 |
| 6 | A | 1200 | 920 | 520 | 830 | 420 |
| 7 | A | 1200 | 920 | 520 | 830 | 420 |
| 8 | B | 1200 | 900 | 450 | 780 | 300 |
| 9 | B | 1200 | 900 | 450 | 830 | 420 |
| 10 | C | 1200 | 890 | 470 | 780 | 310 |
| 11 | C | 1200 | 890 | 470 | 830 | 420 |
| 12 | C | 1200 | 890 | 470 | 830 | 420 |
| 13 | C | 1200 | 890 | 470 | 830 | 420 |
| 14 | C | 1200 | 890 | 470 | 830 | 420 |

TABLE 2-continued

| 15 | C | 1200 | 890 | 470 | 830 | 420 |
| 16 | D | 1200 | 890 | 470 | 780 | 310 |

| | Pickling conditions | | | | | | | |
|---|---|---|---|---|---|---|---|---|
| Steel sheet No. | Nitric acid concentration HNO$_3$ (g/L) | Hydrofluoric acid concentration HF (g/L) | Hydrochloric acid HCl (g/L) | HCl/ HNO$_3$ | HCl/ HF | HCl/ (HNO$_3$ + HF) | Pickling solution temperature (° C.) | Pickling time (second) |
| 1 | 120 | — | 15 | 0.13 | — | — | 40 | 10 |
| 2 | 120 | — | 15 | 0.13 | — | — | 40 | 10 |
| 3 | — | 120 | 15 | — | 0.13 | — | 40 | 10 |
| 4 | 80 | — | 15 | 0.19 | — | — | 40 | 10 |
| 5 | 120 | — | 35 | 0.29 | — | — | 40 | 10 |
| 6 | 120 | — | 15 | 0.13 | — | — | 15 | 10 |
| 7 | 120 | — | 15 | 0.13 | — | — | 40 | 1 |
| 8 | 120 | — | 15 | 0.13 | — | — | 40 | 10 |
| 9 | 120 | — | 15 | 0.13 | — | — | 40 | 10 |
| 10 | 120 | — | 15 | 0.13 | — | — | 40 | 10 |
| 11 | 120 | — | 15 | 0.13 | — | — | 40 | 10 |
| 12 | — | 100 | 15 | — | 0.15 | — | 40 | 10 |
| 13 | 100 | 100 | 20 | — | — | 0.10 | 40 | 10 |
| 14 | 50 | — | 1 | 0.02 | — | — | 40 | 10 |
| 15 | 250 | — | 50 | 0.20 | — | — | 40 | 10 |
| 16 | 120 | — | 15 | 0.13 | — | — | 40 | 10 |

A test specimen is cut out from each of the thus obtained cold rolled steel sheets and subjected to the following tests.

1) Evaluation of Mechanical Characteristics

A tensile test specimen of JIS No. 5 is cut out in a direction perpendicular to the rolling direction (C direction) as a tensile direction according to JIS Z2201:2011 and subjected to a tensile test according to JIS Z2241:2011 to measure a tensile strength TS.

2) Identification of Steel Sheet Surface Structure

The test specimen cut out from each cold rolled steel sheet is electropolished at an electrical quantity of about 2.5~5 coulomb per 1 cm$^2$ in an iodine methanol solution to remove the surface up to a depth of approximately 3 μm to flatten the surface and etched with nital to develop a steel structure, and thereafter the structure included in the steel sheet surface is identified how to be constituted from either of polygonal ferrite, bainitic ferrite, martensite and austenite by means of SEM. Also, each volume fraction of polygonal ferrite, bainitic ferrite, martensite and austenite is obtained by observing the structure with SEM at 2000 magnifications and determining an area ratio of each structure occupied in the whole view through an image analysis.

3) Measurement of Crystal Grain Size in Steel Sheet Surface Structure

Next, the test specimen used in the identification of the steel sheet surface structure is subjected to a structure observation with SEM at 2000 magnifications, whereby each 10 crystal grains of polygonal ferrite and bainitic ferrite are selected randomly to measure their crystal grain sizes, an average value of which is set as a crystal grain size of the test specimen. Moreover, a long size of a crystal grain is measured by using a length measurement function between 2 points installed in a scanning type electron microscope (JCM-5000) made by Japan Electro Optics laboratory, and the measured value is determined as a grain size of the crystal grain.

4) Measurement of Si Concentration in Steel Sheet Surface Structure

The test specimen cut out from each cold rolled steel sheet is electropolished at an electrical quantity of 2.5~5 coulomb per 1 cm$^2$ in an iodine methanol solution to remove the surface at a thickness of approximately 1~2 μm to flatten the surface and then etched with nital to develop a steel structure. Next, a surface area of 100 μm squares in the test specimen is subjected to element mapping with EPMA under conditions that an accelerating voltage is 15 kV and an irradiation current is 3.0×10$^{-8}$ A to measure a Si strength distribution, which is averaged to determine a Si strength A of the steel sheet surface. The Si strength A corresponds to a Si concentration of the raw steel sheet. Then, each 3 crystal grains of polygonal ferrite (PF) and bainitic ferrite (BF) identified in the above 2) are selected randomly and Si concentrations thereof are measured with EPMA, and an average value of the 6 crystal grains is set as a Si strength B in PF and BF. From the Si strength A and Si strength B is determined Si concentration in PF and BF on the steel sheet surface by the following formula:

Si concentration (mass %) in PF and BF=Si concentration in the raw steel material (mass %)×B/A.

5) Phosphating Test

The test specimen cut out from each cold rolled steel sheet is subjected to phosphate treatment with a degreasing agent: FC-E2011, a surface conditioning agent: PL-X and a phosphating agent: Parubondo PB-L3065, which are made by Nihon Parkerizing Co., Ltd, so as to provide an adhesion amount of a phosphated coating of 1.7~3.0 g/m$^2$ per one side surface under the following standard condition and a low temperature condition of lowering the phosphating solution temperature.

<Standard Condition>

Degreasing step; treating temperature: 40° C., treating time: 120 seconds

Spray degreasing, surface conditioning step; pH: 9.5, temperature: room temperature, time: 20 seconds Phosphating step; phosphating solution temperature: 35° C., treating time: 120 seconds <Low Temperature Condition>

A condition of lowering the phosphating solution temperature in the above standard condition to 33° C.

<Evaluation of Phosphatability>

The steel sheet surface subjected to the phosphate treatment as described above is observed with SEM at 1000 magnifications to measure the presence or absence of lack of covering and an average size of the phosphated crystal. A steel having lack of covering is evaluated to be X as being inappropriate, a steel having no lack of covering and an average size of phosphated crystal of not more than 10 μm is evaluated to be Δ, and a steel having no lack of covering and an average size of phosphated crystal of not more than 7 μm is evaluated to be ○. In this regard, Δ and ○ are within an acceptable range.

Corrosion Test

The surface of the test specimen subjected to the phosphate treatment is electrodeposited with an electrodeposition paint: PN-150 made by Nippon Paint Co., Ltd. so as to provide a coating thickness of 20 μm and then subjected to the following three corrosion tests.

<Warm Salt Water Immersion Test>

After the surface of the test specimen subjected to the phosphate treatment and electrodeposition is provided with a cross cut flaw of 45 mm in length by means of a cutter, the test specimen is immersed in a solution of 5 mass % NaCl (60° C.) for 240 hours, washed with water, dried and attached on its cut flaw portion with an adhesive tape, and thereafter a tape peeling test of peeling off the tape is conducted to measure a maximum peeling width in total ranging from right to left of the cut flaw portion. When the maximum peeling width is not more than 5.0 mm, the corrosion resistance in the salt water immersion test water can be evaluated to be good.

<Salt Water Spraying Test (SST)>

After the surface of the test specimen subjected to the phosphate treatment and electrodeposition is provided with a cross cut flaw of 45 mm in length by means of a cutter, the test specimen is subjected to a salt water spraying test for 1000 hours with an aqueous solution of 5 mass % NaCl in accordance with a neutral salt spray test defined in JIS Z2371 (2000), and thereafter a tape peeling test on the cut flaw portion is conducted to measure a maximum peeling width in total ranging from right to left of the cut flaw portion. When the maximum peeling width is not more than 4.0 mm, the corrosion resistance in the warm salt water spraying test can be evaluated to be good.

<Composite Cycle Corrosion Test (CCT)>

After the surface of the test specimen subjected to the phosphate treatment and electrodeposition is provided with a cross cut flaw of 45 mm in length by means of a cutter, the test specimen is subjected to a corrosion test that one cycle of salt water spraying (aqueous solution of 5 mass % NaCl: 35° C., relative humidity: 98%)×2 hours→drying (60° C., relative humidity: 30%)×2 hours→wetting (50° C., relative humidity: 95%)×2 hours is repeated 90 cycles, washed with water, dried and thereafter a tape peeling test is conducted on the cross cut flaw portion to measure a maximum peeling width in total ranging from right to left of the cut flaw portion. When the maximum peeling width is not more than 6.0 mm, the corrosion resistance in the composite cycle corrosion test can be evaluated to be good.

The results of the above tests are collectively shown in Table 3. As seen from these results, the steel sheets of Invention Examples having a steel sheet surface structure (Si concentration, grain size) adapted to the invention conditions are excellent in the phosphatability and are small in the maximum peeling width in all of the warm salt water immersion test, salt water spraying test and composite cycle corrosion test and indicate good corrosion resistance after coating. On the contrary, the steel sheets of Comparative Examples (Nos. 1 and 8) having a steel sheet surface structure (Si concentration, grain size) not satisfied with the invention conditions are poor in the phosphatability and the corrosion resistance after coating.

Moreover, as a result of measuring the distributions in depth direction of O, Si, Mn and Fe on each steel sheet surface shown in Table 3 with GDS, it is confirmed that peaks of Si and O do not appear in any of the steel sheets (Nos. 2, 3, and 9~13) pickled under preferable conditions of the invention and the Si-containing oxide layer is sufficiently removed. For reference, a profile in depth direction of O, Si, Mn and Fe by surface analysis of the test specimen No. 2 (Invention Example) in Table 3 is shown in FIG. 1.

TABLE 3

| Steel sheet No. | Steel symbol | Tensile strength TS (MPa) | Structure of steel sheet surface※ | Volume fraction of PF + BF※ (%) | Si concentration in PF, BF※ (mass %) | Crystal grain size of PF, BF (um) |
|---|---|---|---|---|---|---|
| 1 | A | 782 | PF + BF + M | 65 | 1.1 | <u>11</u> |
| 2 | A | 825 | PF + BF + M + A | 60 | 0.9 | 7 |
| 3 | A | 823 | PF + BF + M + A | 60 | 0.9 | 7 |
| 4 | A | 822 | PF + BF + M + A | 60 | 0.8 | 7 |
| 5 | A | 820 | PF + BF + M + A | 60 | 0.9 | 7 |
| 6 | A | 823 | PF + BF + M + A | 60 | 0.8 | 8 |
| 7 | A | 820 | PF + BF + M + A | 60 | 0.8 | 7 |
| 8 | B | 1220 | PF + BF + M | 50 | <u>3.2</u> | 8 |
| 9 | B | 1290 | PF + BF + M + A | 60 | 2.3 | 5 |
| 10 | C | 1010 | PF + BF + M | 50 | 2.0 | 7 |
| 11 | C | 1100 | PF + BF + M + A | 60 | 0.8 | 4 |
| 12 | C | 1090 | PF + BF + M + A | 60 | 0.9 | 5 |
| 13 | C | 1095 | PF + BF + M + A | 60 | 0.8 | 4 |
| 14 | C | 1100 | PF + BF + M + A | 60 | 1.0 | 5 |
| 15 | C | 1098 | PF + BF + M + A | 60 | 0.9 | 6 |
| 16 | <u>D</u> | 1100 | PF + BF + M + A | 40 | 1.5 | 6 |

TABLE 3-continued

| Steel sheet No. | Phosphatability Standard condition | Phosphatability Low temperature condition | Warm salt water immersion test (35° C.) | Salt water spraying test (35° C.) | Composite cycle corrosion test (33° C.) | | Remarks |
|---|---|---|---|---|---|---|---|
| 1 | X | X | 5.2 | 4.3 | 6.2 | 6.5 | Comparative Example |
| 2 | ○ | ○ | 4.2 | 3.7 | 5.4 | 5.6 | Invention Example |
| 3 | ○ | ○ | 4.5 | 3.8 | 5.8 | 5.9 | Invention Example |
| 4 | ○ | Δ | 4.6 | 3.9 | 5.7 | 5.8 | Invention Example |
| 5 | ○ | Δ | 4.5 | 3.7 | 5.9 | 5.9 | Invention Example |
| 6 | ○ | Δ | 4.7 | 3.9 | 5.8 | 5.9 | Invention Example |
| 7 | ○ | Δ | 4.8 | 3.9 | 5.6 | 5.9 | Invention Example |
| 8 | X | X | 4.7 | 4.2 | 6.2 | 6.3 | Comparative Example |
| 9 | ○ | ○ | 4.3 | 3.6 | 5.5 | 5.7 | Invention Example |
| 10 | ○ | ○ | 4.1 | 3.7 | 5.6 | 5.7 | Invention Example |
| 11 | ○ | ○ | 4.3 | 3.5 | 5.6 | 5.7 | Invention Example |
| 12 | ○ | ○ | 4.2 | 3.6 | 5.5 | 5.8 | Invention Example |
| 13 | ○ | ○ | 4.2 | 3.5 | 5.6 | 5.7 | Invention Example |
| 14 | Δ | Δ | 4.4 | 3.9 | 5.7 | 5.9 | Invention Example |
| 15 | Δ | Δ | 4.4 | 3.8 | 5.8 | 5.9 | Invention Example |
| 16 | ○ | ○ | 4.4 | 3.7 | 5.6 | 5.8 | Conventional Example |

X PF: Polygonal ferrite, BF: Bainitic ferrite, M: Martensite, A: Austenite

The Si-containing high-strength cold rolled sheet manufactured by the invention is not only excellent in the phosphatability and corrosion resistance after coating, but also has a high strength and an excellent workability, so that it can be suitably used as not only a material for automotive members but also a material required to have similar properties in the field of home electric appliances and building materials.

The invention claimed is:

1. A method for manufacturing a Si-containing high-strength cold rolled steel sheet, characterized in that a steel slab having a chemical composition comprising C: 0.02~0.3 mass %, Si: 0.8~2.0 mass %, Mn: 1.0~5.0 mass % and the remainder being Fe and inevitable impurities with a ratio of Si content to Mn content (Si/Mn) exceeding 0.4 is hot rolled, cold rolled, subjected to a continuous annealing wherein a cooling stop temperature in cooling after soaking annealing is higher than 300° C., and then pickled to remove a Si-containing oxide layer from the surface of the steel sheet, such that a metallic structure of the surface of the steel sheet contains polygonal ferrite and/or bainitic ferrite having a Si concentration of not more than 3.0 mass %.

2. The method for manufacturing a Si-containing high-strength cold rolled steel sheet according to claim 1, wherein the pickling is conducted by using either one of a mixed acid of nitric acid and hydrochloric acid, a mixed acid of hydrofluoric acid and hydrochloric acid, and a mixed acid of nitric acid, hydrofluoric acid and hydrochloric acid as a pickling solution.

3. The method for manufacturing a Si-containing high-strength cold rolled steel sheet according to claim 1, wherein the pickling is conducted by using a mixed acid of nitric acid and hydrochloric acid having a concentration of nitric acid of more than 100 g/L but not more than 150 g/L and a concentration ratio of hydrochloric acid to nitric acid R (HCl/HNO$_3$) of 0.03~0.25, or a mixed acid of hydrofluoric acid and hydrochloric acid having a concentration of hydrofluoric acid of more than 100 g/L but not more than 150 g/L and a ratio of hydrochloric acid to hydrofluoric acid R (HCl/HF) of 0.03~0.25.

4. The method for manufacturing a Si-containing high-strength cold rolled steel sheet according to claim 2, wherein the pickling is conducted by using a mixed acid of nitric acid and hydrochloric acid having a concentration of nitric acid of more than 100 g/L but not more than 150 g/L and a concentration ratio of hydrochloric acid to nitric acid R (HCl/HNO$_3$) of 0.03~0.25, or a mixed acid of hydrofluoric acid and hydrochloric acid having a concentration of hydrofluoric acid of more than 100 g/L but not more than 150 g/L and a ratio of hydrochloric acid to hydrofluoric acid R (HCl/HF) of 0.03~0.25.

5. The method for manufacturing a Si-containing high-strength cold rolled steel sheet according to claim 1, wherein the pickling is conducted at a temperature of a picking solution of 20~70° C. for 3~30 seconds.

6. The method for manufacturing a Si-containing high-strength cold rolled steel sheet according to claim 2, wherein the pickling is conducted at a temperature of a picking solution of 20~70° C. for 3~30 seconds.

7. The method for manufacturing a Si-containing high-strength cold rolled steel sheet according to claim 3, wherein the pickling is conducted at a temperature of a picking solution of 20~70° C. for 3~30 seconds.

8. The method for manufacturing a Si-containing high-strength cold rolled steel sheet according to claim 4, wherein the pickling is conducted at a temperature of a picking solution of 20~70° C. for 3~30 seconds.

* * * * *